United States Patent
Feichtinger et al.

(10) Patent No.: US 8,471,672 B2
(45) Date of Patent: Jun. 25, 2013

(54) ELECTRICAL MULTILAYER COMPONENT

(75) Inventors: Thomas Feichtinger, Graz (AT); Georg Krenn, Graz (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 13/202,451

(22) PCT Filed: Feb. 22, 2010

(86) PCT No.: PCT/EP2010/052203
§ 371 (c)(1), (2), (4) Date: Aug. 19, 2011

(87) PCT Pub. No.: WO2010/094795
PCT Pub. Date: Aug. 26, 2010

(65) Prior Publication Data
US 2011/0298578 A1    Dec. 8, 2011

(30) Foreign Application Priority Data

Feb. 23, 2009  (DE) .................. 10 2009 010 212

(51) Int. Cl.
*H01C 7/10* (2006.01)
(52) U.S. Cl.
USPC .............................. 338/20; 338/309; 338/21
(58) Field of Classification Search
None
See application file for complete search history.

(56) References Cited

U.S. PATENT DOCUMENTS

| | | | |
|---|---|---|---|
| 4,908,730 A | | 3/1990 | Westrom |
| 6,052,272 A | * | 4/2000 | Kuroda et al. ............. 361/303 |
| 6,147,587 A | * | 11/2000 | Hadano et al. ............ 338/21 |
| 6,370,010 B1 | * | 4/2002 | Kuroda et al. ........... 361/306.1 |
| 6,608,547 B1 | * | 8/2003 | Greier et al. .............. 338/21 |
| 7,696,677 B2 | * | 4/2010 | Ito et al. ................. 310/365 |
| 2006/0170010 A1 | * | 8/2006 | Brunner et al. ............ 257/246 |
| 2007/0273469 A1 | | 11/2007 | Lien et al. |
| 2008/0186127 A1 | | 8/2008 | Feichtinger et al. |
| 2009/0035560 A1 | * | 2/2009 | Block et al. ............... 428/336 |
| 2012/0044039 A1 | | 2/2012 | Feichtinger et al. |

FOREIGN PATENT DOCUMENTS

| | | |
|---|---|---|
| CN | 102308341 A | 1/2012 |
| DE | 198 56 939 A1 | 6/2000 |
| DE | 10 2004 058 410 A1 | 6/2006 |
| DE | 10 2007 002 429 A1 | 5/2008 |
| GB | 2 345 390 A | 7/2000 |
| JP | 2000-188168 A | 7/2000 |

* cited by examiner

*Primary Examiner* — Kyung Lee
(74) *Attorney, Agent, or Firm* — Slater & Matsil, L.L.P.

(57) ABSTRACT

An electrical multilayer component includes a base body with at least two external electrodes. The electrical multilayer component includes at least a first and a second internal electrode, which are each electrically conductively connected to a respective external electrode. The electrical multilayer component includes at least one ceramic varistor layer encompassing at least the first internal electrode. The electrical multilayer component includes at least one dielectric layer arranged between the at least one varistor layer and the second internal electrode. The dielectric layer has at least one opening, which can be filled with a gaseous medium.

19 Claims, 4 Drawing Sheets

ELECTRICAL MULTILAYER COMPONENT

This patent application is a national phase filing under section 371 of PCT/EP2010/052203, filed Feb. 22, 2010, which claims the priority of German patent application 10 2009 010 212.4, filed Feb. 23, 2009, each of which is incorporated herein by reference in its entirety.

BACKGROUND

The document DE 10 2004 058 410 A1 discloses an electrical multilayer component with a protection element.

SUMMARY OF THE INVENTION

Embodiments of the present invention specify an electrical multilayer component comprising an ESD protection element having a low breakdown voltage and a low ESD clamping voltage.

An electrical multilayer component is specified, comprising a base body with at least two external electrodes. The external electrodes are preferably arranged at least at the side areas of the electrical multilayer component.

The electrical multilayer component comprises at least one first and at least one second internal electrode, which, in embodiments, can be electrically conductively connected to a respective external electrode.

The electrical multilayer component comprises at least one ceramic varistor layer, which encompasses at least the first internal electrode. The first and second internal electrodes can be connected to the external electrodes directly or via plated-through holes in the base body.

The electrical multilayer component comprises at least one dielectric layer arranged between the at least one varistor layer and the second internal electrode and adjoining the varistor layer.

The dielectric layer of the electrical multilayer component has at least one opening. The opening can be embodied as a perforation, as a cutout or as a cavity or a hollow space.

The opening in the dielectric layer is preferably filled with a gaseous medium and, in embodiments, adjoins the varistor layer.

In one embodiment, the gaseous medium with which the opening in the dielectric layer is filled is air. In a further embodiment, the opening in the dielectric layer can also be filled with a different gas or a gas mixture. In particular, the opening is filled with a noble gas.

In one embodiment of the electrical multilayer component, the dielectric layer comprises a porous material. The porous material comprises openings or depressions or partly or completely closed hollow spaces which are filled with the gaseous medium.

In one embodiment, at least one further layer is arranged between the dielectric layer and the second internal electrode. The further layer is preferably embodied in such a way that it encompasses the second internal electrode.

In one embodiment of the electrical multilayer component, the external electrodes extend at least partly right on to the top side and/or underside of the base body.

One embodiment of the electrical multilayer component provides for the second internal electrode to be formed by partial regions of one of the external electrodes of the electrical multilayer component. Preferably, that partial region of the external electrode which has a direct contact with the body of the electrical multilayer component performs the function of the second internal electrode.

In one embodiment of the electrical multilayer component, a third internal electrode is arranged in the body. In one embodiment, the third internal electrode is embodied as a floating internal electrode. The third internal electrode is preferably spaced apart from the external electrodes of the electrical multilayer component and has no electrical contact with one or more external electrodes of the electrical multilayer component.

In one embodiment of the electrical multilayer component, the first and second internal electrodes at least partly overlap.

In a further embodiment, the internal electrodes are embodied in such a way that they preferably do not mutually overlap.

In a further embodiment, the first and/or the second internal electrode at least partly overlap(s) the third internal electrode.

In a further embodiment, the first and second internal electrodes do not overlap the third internal electrode.

In one embodiment, the third internal electrode is arranged between the dielectric layer and one of the first or second internal electrodes of the electrical multilayer component.

In one embodiment, the electrical multilayer component comprises at least one covering assembly.

In one embodiment, the covering assembly encompasses at least one dielectric layer.

In one embodiment, the at least one covering assembly of the electrical multilayer component and/or the dielectric layers having at least one opening comprise the same material.

In a further embodiment, it is also possible for the at least one covering assembly and the dielectric layer to comprise different materials.

Preferably, a zirconium oxide (ZrO) or a zirconium oxide-glass composite, an aluminum oxide ($AlO_x$) or an aluminum oxide-glass composite, a manganese oxide (MgO) or a manganese oxide glass is used for the dielectric layer. However, the dielectric layers can also comprise further materials.

In one embodiment of the electrical multilayer component, the base body has individual or a plurality of plated-through holes, so-called vias, by means of which the first and/or the second internal electrode of the electrical multilayer component are/is connected to external contacts of the electrical multilayer component. The third internal electrode, as a floating internal electrode, is preferably not connected to external contacts of the electrical multilayer component via plated-through holes.

In one embodiment, the external contacts of the electrical multilayer component are embodied as an array (row arrangement or matrix arrangement). In this case, especially a land grid array (LGA) or ball grid array (BGA) is suitable. In the case where contact is made with the electrical multilayer component by means of arrays (LGA, BGA), at least the first and second internal electrodes of the electrical multilayer component are preferably connected to the external contacts of the electrical multilayer component via plated-through holes.

In one embodiment of the electrical multilayer component, the dielectric layer comprising at least one opening is embodied in such a way that together with at least one adjacent varistor layer, which encompasses at least one first internal electrode, and a further overlapping internal electrode it forms an ESD charge section (spark gap).

In one preferred embodiment, the electrical multilayer component has the function of a varistor with an integrated gas discharge protection element.

The varistor preferably has a capacitance of less than 1 pF.

An electrical multilayer component as described above has a reduction of the total capacitance of the component specifically by virtue of the arrangement of the small capacitance of the dielectric layer having an opening, said small capacitance being connected in series with the varistor capacitance. The clamping voltage of the electrical multilayer component is only slightly increased by the dielectric layer compared with conventional multilayer components.

The specified clamping voltage of the ESD protection element is substantially dependent on the distance between the internal electrode layers, and also on the embodiment of the opening in the dielectric layer.

Consequently, with a very small capacitance, a low clamping voltage is achieved by means of a design of the electrical multilayer component as described above.

The additional dielectric layer, containing an opening, between at least two internal electrodes of the electrical multilayer component significantly reduces the total capacitance of the electrical multilayer component.

BRIEF DESCRIPTION OF THE DRAWINGS

The subjects described above will be explained in greater detail with reference to the following figures and embodiments.

The drawings described below should not be regarded as true to scale. Rather, the illustrations may be illustrated in enlarged, reduced, or else distorted fashion in specific details. Elements which are identical to one another or which perform the same functions are designated by the same reference symbols.

In the figures:

FIG. 1 shows a first embodiment of the electrical multilayer component;

FIG. 2 shows a further embodiment of the electrical multilayer component;

FIG. 3 shows a further variant of the electrical multilayer component;

FIG. 4 shows a further embodiment of the electrical multilayer component, wherein the opening in the dielectric layer is arranged between a third internal electrode and an external contact;

FIG. 5 shows a schematic construction of a further embodiment of the electrical multilayer component, wherein the dielectric layer is arranged between two varistor layers each encompassing an internal electrode;

FIG. 6 shows a further embodiment of the electrical multilayer component, wherein the external contacts are embodied as a ball grid array; and FIG. 7 shows a further embodiment of the electrical multilayer component, wherein the internal electrodes do not overlap.

Figure 1:
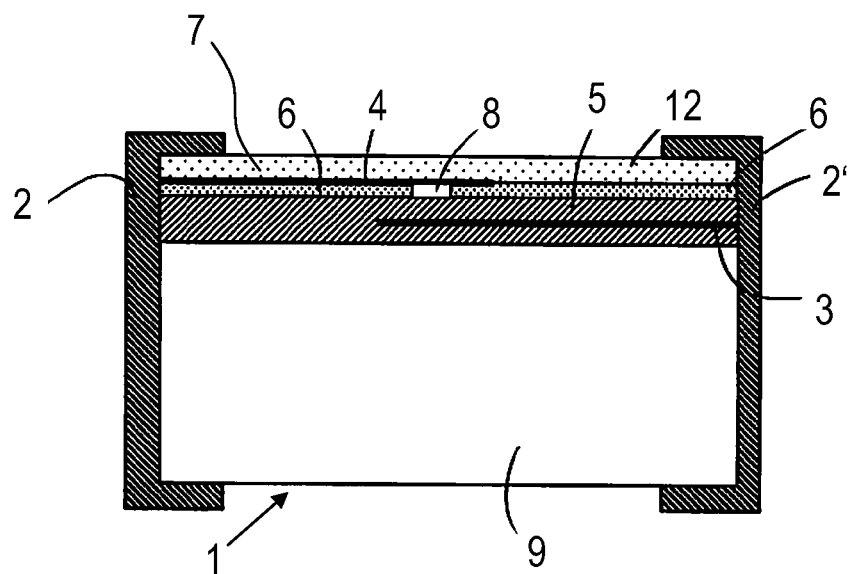

The following list of reference symbols may be used in conjunction with the drawings:
1 Base body
2, 2' External electrode
3 First internal electrode
4 Second internal electrode
5 Varistor layer
8, 8' Opening
9, 9' Covering assembly
10, 10' Plated-through hole (via)
11 Third internal electrode
12 Covering glass
13, 13' Bump

DETAILED DESCRIPTION OF ILLUSTRATIVE EMBODIMENTS

FIG. 1 shows a first embodiment of an electrical multilayer component, which comprises a base body 1. External electrodes 2, 2' are arranged at the side areas of the base body 1. The external electrodes are conductively connected to internal electrodes 3, 4 lying in the interior of the base body. The base body 1 has a varistor layer 5 encompassing a first internal electrode 3. The first internal electrode 3 is enclosed for the most part, i.e., apart from the connection to the external electrodes 2, 2', by the varistor layer 5. The electrical multilayer component comprises a further layer 7, which is embodied as covering glass 12 in the embodiment illustrated.

A dielectric layer 6 is arranged between the further layer 7 and the varistor layer 5. The dielectric layer comprises an opening 8. A second internal electrode 4 is arranged at the interface between the dielectric layer 6 and the further layer 7. The free ends of the first 3 and second 4 internal electrodes overlap. The opening 8 in the dielectric layer 6 is preferably filled with a gaseous medium. The base body 1 of the electrical multilayer component is terminated in the thickness direction by a covering assembly 9 and the further layer 7, which is embodied as covering glass 12. The covering assembly 9 encompasses at least one dielectric layer.

Figure 2:
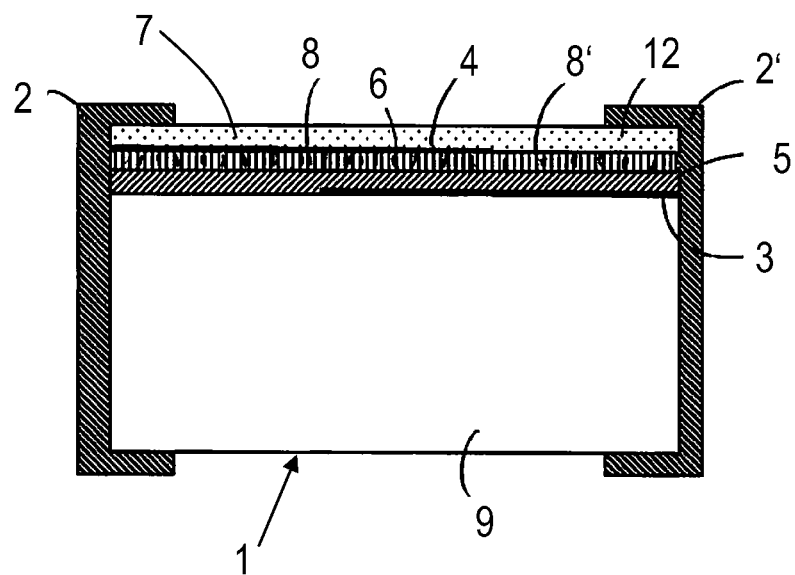

FIG. 2 shows a further embodiment of the electrical multilayer component. The construction of the electrical multilayer component according to FIG. 2 is similar to the construction of the electrical multilayer component in FIG. 1, with the difference that the dielectric layer 6 of the electrical multilayer component comprises a porous material. The dielectric layer 6 has a plurality of openings or perforations 8, 8'. The first electrode 3 is arranged at the interface between the varistor layer 5 and the covering assembly 9. The free ends of the first 3 and second 4 internal electrodes overlap in a wide region of the electrode area.

In an embodiment that is not illustrated, however, the first electrode 3 is also encompassed for the most part by the varistor layer 5 as in the embodiment of the electrical multilayer component illustrated in FIG. 1.

Figure 3:
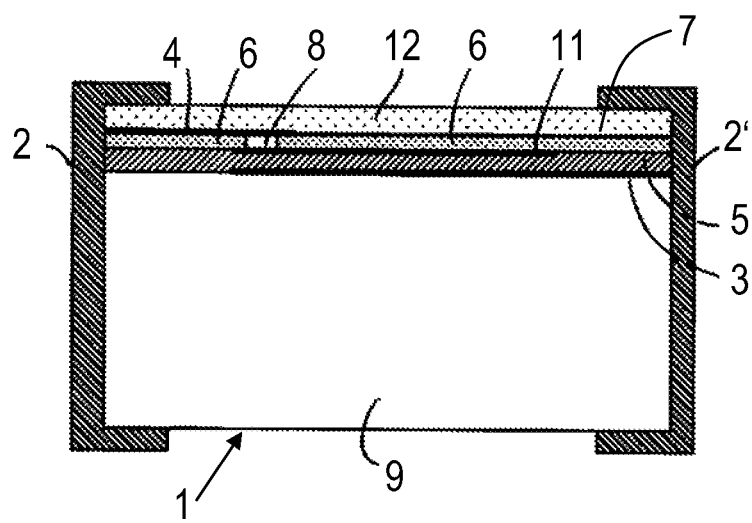

FIG. 3 shows a further embodiment of the electrical multilayer component. The electrical multilayer component comprises a base body 1, at which external electrodes 2, 2' are arranged at the side areas. The base body 1 has a first internal electrode 3, which is arranged at the interface between a varistor layer 5 and a covering assembly 9. The electrical multilayer component comprises a second internal electrode 4, which is arranged at an interface with a further layer 7. A dielectric layer 6 having an opening 8 is arranged between the further layer 7 and the varistor layer 5. A further, third internal electrode 11 is arranged between the dielectric layer 6 and the varistor layer 5. The third internal electrode 11 has no direct, in particular no electrical contact with the external electrodes 2, 2' of the electrical multilayer component. The third internal electrode 11 is therefore floating with no fixed electrical potential. The first 3 and the second 4 internal electrodes of the electrical multilayer component are furthermore in direct electrical contact with the external electrodes 2, 2' of the electrical multilayer component.

Figure 4:
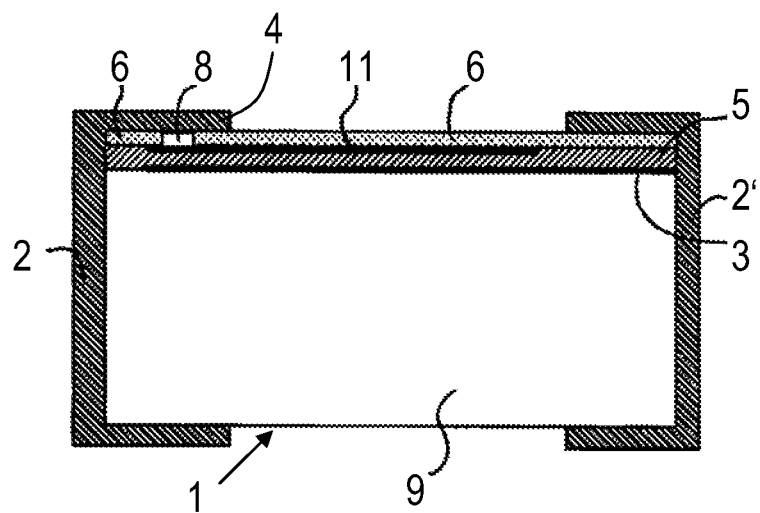

FIG. 4 shows a further embodiment of the electrical multilayer component. The electrical multilayer component comprises a base body 1. The embodiment of the electrical multilayer component in FIG. 4 is constructed similarly to the embodiment in FIG. 3. The second electrode 4 is formed by a partial region of the external electrode 2 in the embodiment according to FIG. 4. The dielectric layer 6 is directly adjacent to the external electrode 2. The opening 8 in the dielectric layer 6 is arranged between the third electrode 11 and the partial region of the external electrode 2, which comprises the function of the second internal electrode 4.

Figure 5:
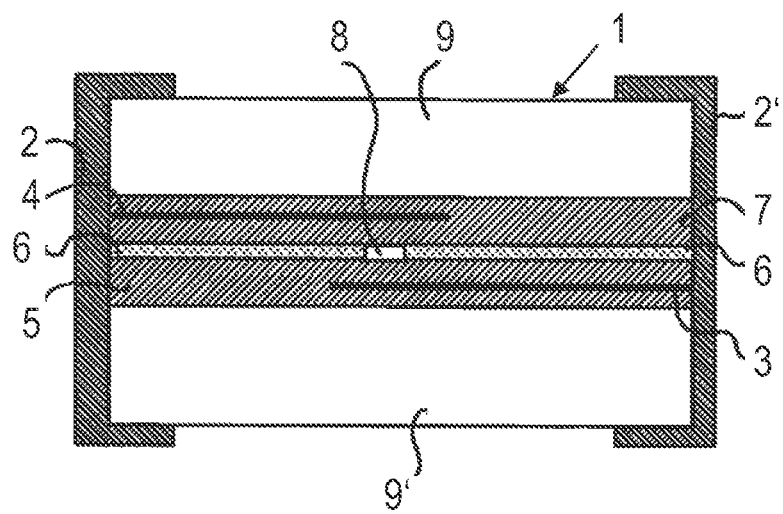

FIG. 5 shows a further embodiment of the electrical multilayer component. The electrical multilayer component comprises a base body 1 with external electrodes 2, 2' arranged at the side areas. The base body 1 comprises a varistor layer 5, which for the most part encloses the first internal electrode 3. A dielectric layer 6 having an opening 8 is arranged above the varistor layer 5. A further layer 7 is adjacent to the dielectric layer 6. The further layer for the most part encloses a second electrode 4. In the embodiment illustrated, the further layer 7 is embodied as a varistor layer. The electrical multilayer component is terminated by covering assemblies 9, 9' in the thickness direction. The covering assemblies 9, 9' each encompasses at least one dielectric layer. The internal electrodes 3, 4 overlap one another and together with the opening 8 of the dielectric layer 6 form an ESD protection element.

Figure 6:
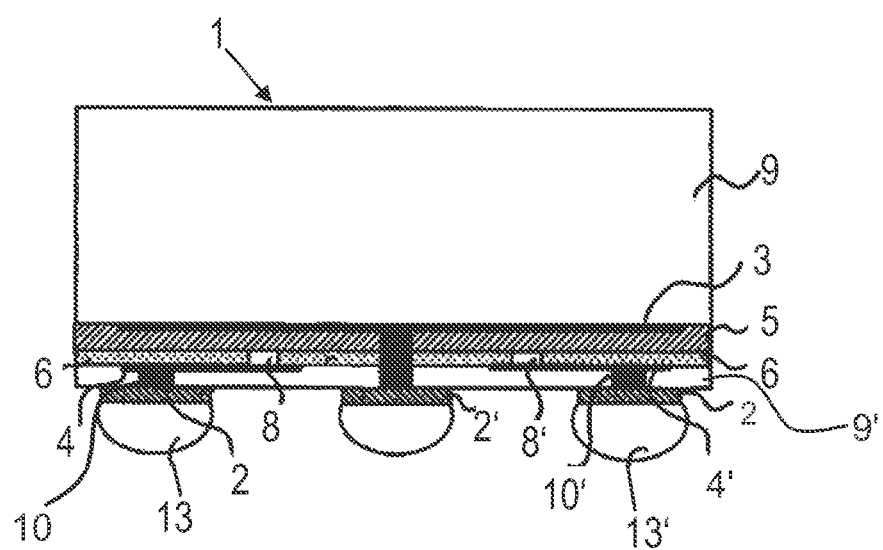

FIG. 6 shows a further embodiment of the electrical multilayer component. The base body 1 of the electrical multilayer component comprises a varistor layer 5, on which a first internal electrode 3 is arranged. A dielectric layer 6 is arranged below the varistor layer 5 in the thickness direction, said dielectric layer having two openings 8, 8' in the embodiment illustrated. The base body 1 of the electrical multilayer component is terminated by covering assemblies 9, 9' in the thickness direction. The covering assemblies 9, 9' encompass at least one dielectric layer.

The electrical multilayer component comprises two second electrodes 4, 4', which are arranged at the interface between the dielectric layer 6 and the second covering assembly 9'. Contact is made with the first internal electrodes 3 and the two second internal electrodes 4, 4' by means of plated-through holes (vias) 10, 10'. In the embodiment illustrated, the external contacts 2, 2' of the electrical multilayer component are embodied as ball grid arrays (BGA). So-called bumps 13, 13' are arranged at the external contacts 2, 2'.

Figure 7:
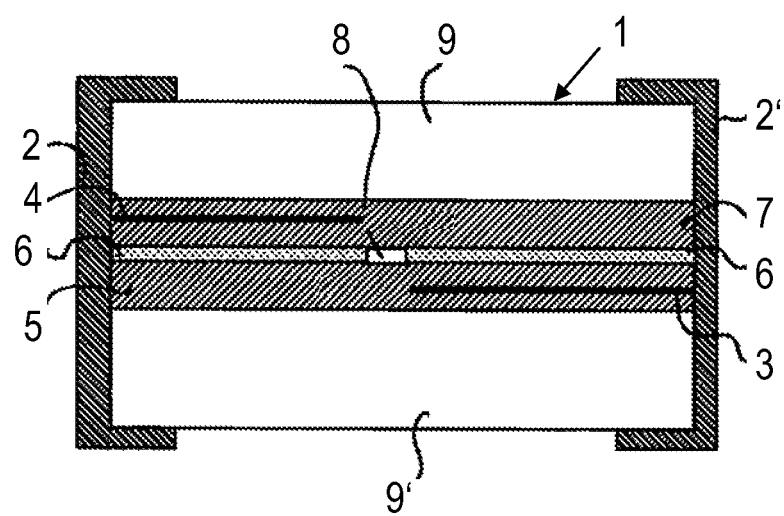

FIG. 7 shows a further embodiment of the electrical multilayer component. The embodiment of the electrical multilayer component in FIG. 7 is constructed similarly to the embodiment in FIG. 5. The first 3 and second 4 internal electrodes of the electrical multilayer component do not overlap, however, in the embodiment illustrated. The first 3 and second 4 internal electrodes extend as far as the opening 8 in the dielectric layer 6, the first 3 and second 4 internal electrodes not mutually overlapping in the thickness direction of the electrical multilayer component.

Although in the exemplary embodiments only a limited number of possible developments could be described, the invention is not restricted thereto. It is possible, in principle, for the electrical multilayer component to comprise a plurality of ESD protection devices which are connected in series or in parallel and which are formed by a dielectric layer having one or more openings and at least one adjoining varistor layer. The openings in the dielectric layer can be embodied as a perforation, hollow space, depression or in some other way.

The description of the subjects specified here is not restricted to the individual specific embodiments. Rather, features of the individual embodiments can, insofar as is technically expedient, be combined with one another in any desired manner.

The invention claimed:

1. An electrical multilayer component, comprising:
   a base body with two external electrodes;
   a first and a second internal electrode, which are each electrically conductively connected to a respective external electrode;
   at least one ceramic varistor layer, which adjoins the first internal electrode; and
   at least one dielectric layer arranged between the varistor layer and the second internal electrode, wherein the dielectric layer adjoins the varistor layer, and the dielectric layer has at least one opening that extends completely through the dielectric layer and is filled with a gaseous medium.

2. The electrical multilayer component according to claim 1, wherein the opening in the dielectric layer adjoins the varistor layer.

3. The electrical multilayer component according to claim 1, wherein the dielectric layer comprises a porous material.

4. The electrical multilayer component according to claim 1, further comprising a further layer arranged between the dielectric layer and the second internal electrode, wherein the further layer adjoins the second internal electrode.

5. The electrical multilayer component according to claim 1, wherein the second internal electrode is formed by partial regions of an external electrode.

6. The electrical multilayer component according to claim 1, further comprising a third internal electrode, which comprises a floating internal electrode.

7. The electrical multilayer component according to claim 6, wherein the third internal electrode is arranged between the dielectric layer and the first internal electrode.

8. The electrical multilayer component according to claim 6, wherein the third internal electrode is arranged between the dielectric layer and the second internal electrode.

9. The electrical multilayer component according to claim 1, wherein the base body has at least one covering assembly adjacent the at least one dielectric layer.

10. The electrical multilayer component according to claim 1, wherein the dielectric layer comprises $ZrO_2$, a $ZrO_2$-glass composite, $AlO_x$, an $AlO_x$ glass, MgO or an MgO glass.

11. The electrical multilayer component according to claim 1, wherein the first internal electrode and the second internal electrode are connected to the external electrodes via plated-through holes.

12. The electrical multilayer component according to claim 1, wherein the external electrodes are embodied as a land grid array or as a ball grid array.

13. The electrical multilayer component according to claim 1, wherein the dielectric layer together with at least one adjacent varistor layer and two overlapping internal electrodes forms an ESD discharge section.

14. The electrical multilayer component according to claim 1, wherein the component has the function of a varistor with an integrated gas discharge protection element.

15. The electrical multilayer component according to claim 1, wherein contents of the opening are electrically insulated from the external electrodes.

16. The electrical multilayer component according to claim 1, wherein the at least one opening is spaced from the first internal electrode or the second internal electrode.

17. The electrical multilayer component according to claim 16, wherein the at least one opening is spaced from both the first and second internal electrodes.

18. The electrical multilayer component according to claim 1, wherein the at least one opening is filled only with non-conductive material.

19. The electrical multilayer component according to claim 11, wherein the plated-through holes are spaced from the at least one opening in the dielectric.

* * * * *